United States Patent
Pawelzik et al.

[11] Patent Number: 6,035,463
[45] Date of Patent: Mar. 14, 2000

[54] ACTUATING ASSEMBLY FOR DUAL-OUTPUT VALVE

[75] Inventors: Manfred Pawelzik, Soest; Wolfgang Gebhardt, Menden; Rainer Smieja, Unna, all of Germany

[73] Assignee: Friedrich Grohe AG, Hemer, Germany

[21] Appl. No.: 09/228,744

[22] Filed: Jan. 12, 1999

[30] Foreign Application Priority Data

Jan. 30, 1998 [DE] Germany .......................... 198 03 524

[51] Int. Cl.$^7$ ...................................................... E03C 1/04
[52] U.S. Cl. .......................................... 4/677; 137/625.17
[58] Field of Search ...................... 4/677, 676, 675–678; 137/625.17, 625.24, 597; 251/105, 103, 109

[56] References Cited

U.S. PATENT DOCUMENTS

| 1,181,315 | 5/1916 | Johnson .................................. 251/109 |
| 5,494,077 | 2/1996 | Enoki et al. ........................ 137/625.17 |
| 5,813,436 | 9/1998 | Chen ....................................... 137/801 |

FOREIGN PATENT DOCUMENTS 0 309 443   3/1989   Germany .

*Primary Examiner*—Henry J. Recla
*Assistant Examiner*—Huyen Le
*Attorney, Agent, or Firm*—Herbert Dubno; Andrew Wilford

[57] ABSTRACT

A valve having an input and two outputs is provided with a stem extending radially from and pivotal about a transverse axis from a middle position to one end position directing flow from the input to one of the outputs and to an opposite end position directing flow from the input to the other of the outputs. A valve actuator assembly has a sleeve fixed to the valve and having a rim annularly surrounding and spaced from the stem and lying in a plane generally parallel to the axis and a handle fixed to the stem above the rim and forming a guide extending substantially parallel to the stem. A latch element having an outwardly projecting arm is displaceable in the guide between a rest position with the arm engageable with the rim and blocking displacement of the stem into the one end position and an actuated position unengageable with the rim and permitting displacement of the stem into the one end position. A spring operatively braced between the latch element and the handle urges the latch element into the rest position.

13 Claims, 6 Drawing Sheets

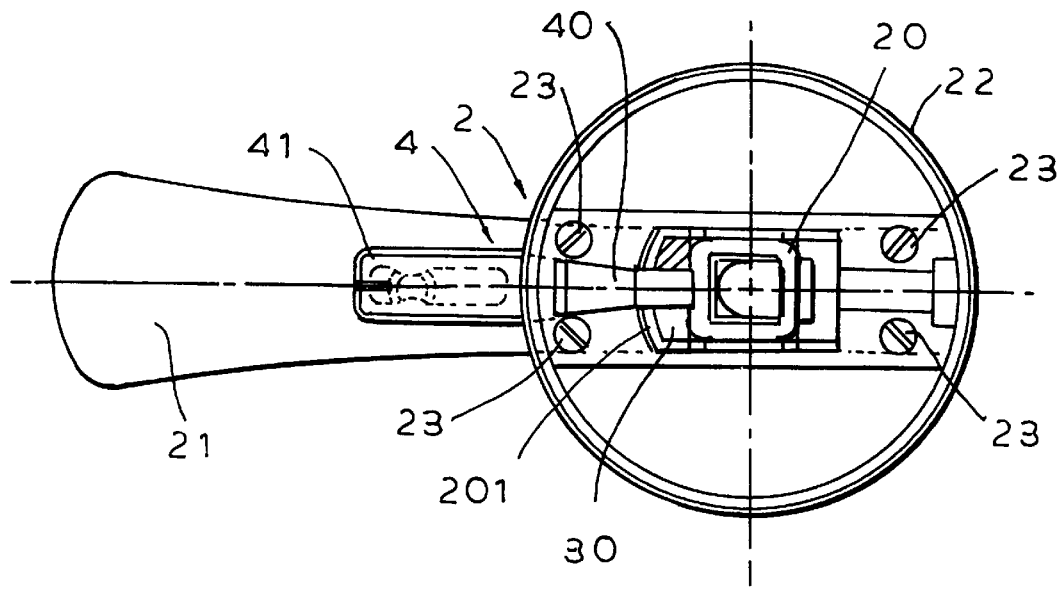
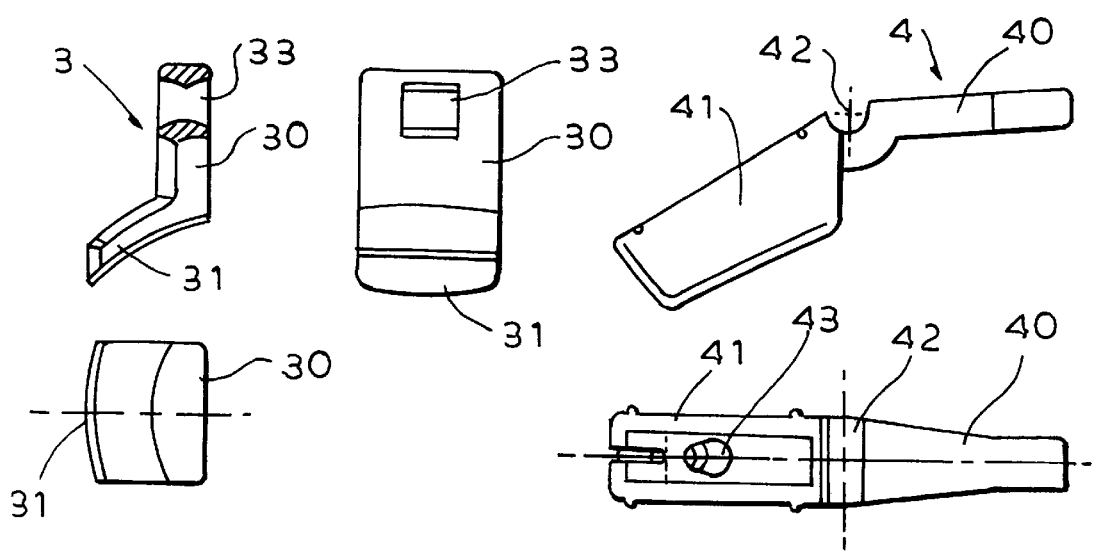

ACTUATING ASSEMBLY FOR DUAL-OUTPUT VALVE

FIELD OF THE INVENTION

The present invention relates to a valve-actuating assembly. More particularly this invention concerns such an assembly for operating a valve having two different alternately pressurizable outputs.

BACKGROUND OF THE INVENTION

A standard mixing valve is known from commonly owned patent application Ser. No. 08/962,373 (now U.S. Pat. No. 5,896,601) of Humpert and from European patent document 0,309,443 of Dagiantis (US equivalent U.S. Pat. No. 4,960, 154) which has a housing holding a fixed valve plate having a flat outer surface generally centered on and perpendicular to an axis and formed offset from the axis with a pair of angularly offset and axially throughgoing inlet ports and offset therefrom with a pair of axially throughgoing outlet ports. Hot and cold water is supplied under pressure to the inlet ports and passages in the housing connect the outlet ports to respective users, e.g. a faucet and a sprayer. A movable valve plate in the housing has an inner surface flatly engaging the outer surface of the fixed valve plate and an opposite outer surface and is formed with an axially throughgoing inlet port alignable with the fixed-plate inlet ports and offset from the respective inlet port with an axially throughgoing outlet port alignable with the fixed-plate outlet ports. A cover element fixed in the housing to the outer surface of the movable plate forms a fluid-flow passage at the outer surface between the movable-plate inlet port and the movable-plate outlet port. An actuator can shift the cover element and movable plate between a closed position with one of the movable-plate ports out of alignment with the respective fixed-plate ports and blocked by the fixed-plate outer face and two open positions in each of which the movable-plate inlet port is aligned with at least one of the fixed-plate inlet ports and the movable-plate outlet port is aligned with a respective one of the fixed-plate outlet ports.

Thus with this system the movable plate is shifted in one direction to direct the output to one of the outputs and in the opposite direction to direct the output to the other of the outputs. In addition as is standard the movable plate can be shifted from side to side or pivoted so that, when separate hot- and cold-water inlets are provided, the temperature of the outputted water can be varied also.

In order to prevent inadvertent displacement of the actuator into one of its positions, for example to prevent unintended pressurization of the sprayer, the actuator of above-cited EP 0,309,443 is a handle provided with a pivotal lever that is urged by a spring into a normal position engaging a rim of a fixed part of the valve housing and preventing pivoting in one direction. When this lever is operated its end moves away from the rim and rides against an outside surface of the valve housing where it is visible and can scratch its surface. Such a system is simple but unattractive. Its operation is apparent to the user and it can in the long run damage the valve housing.

OBJECTS OF THE INVENTION

It is therefore an object of the present invention to provide an improved actuating assembly for a dual-output valve.

Another object is the provision of such an improved actuating assembly for a dual-output valve which overcomes the above-given disadvantages, that is which is simple, attractive, and whose operation is wholly hidden from the user while still being sure and reliable.

SUMMARY OF THE INVENTION

A valve having an input and two outputs is provided with a stem extending radially from a transverse axis and pivotal thereabout from a middle position to one end position directing flow from the input to one of the outputs and to an opposite end position directing flow from the input to the other of the outputs. A valve actuator assembly has according to the invention a sleeve fixed to the valve and having a rim annularly surrounding and spaced from the stem and lying in a plane generally parallel to the axis and a handle fixed to the stem above the rim and forming a guide extending substantially parallel to the stem. A latch element having an outwardly projecting arm is displaceable in the guide between a rest position with the arm engageable with the rim and blocking displacement of the stem into the one end position and an actuated position unengageable with the rim and permitting displacement of the stem into the one end position. A spring operatively braced between the latch element and the handle urges the latch element into the rest position.

With this structure the latch element is extremely simple and can be made to move inside the sleeve when actuated so that it does not ever touch the outer surface of this sleeve. Normally according to the invention the arm has an outer end engageable with the rim and of a part-cylindrical shape complementary to the rim, that is of the same radius of curvature. In addition the sleeve is threaded to the valve.

A lever pivoted on the handle has an outer end accessible outside the sleeve and an opposite inner end engaged with the latch element. The spring is braced between the lever and the handle. More particularly, the handle is provided with a downwardly open recess in which the lever outer end is received and the spring is braced between the lever outer end and the handle. Furthermore the handle has a collar fitting over the stem and the guide is formed along the collar. The lever and the handle have complementary pivot formations defining for the lever a pivot axis generally parallel to the transverse axis. The handle is provided with a skirt extending down around the rim of the sleeve. This skirt can be unitary with the handle or it can be secured by screws to the handle.

The latch element according to the invention can have an upper end projecting as a button through the handle and the spring is in this case engaged between the button and the handle. Furthermore the handle is provided with an elastically deformable membrane over the button and through which the button is actuatable. The button is nonrotatable in the guide and is unitarily formed with the arm.

Normally also according to the invention the valve has a second input and the stem is pivotal about an axis perpendicular to the transverse axis to vary a mix of flows from the inputs. Thus the single handle of such a valve can vary the output temperature, can direct the flow to either of two outputs, and can vary the rate of flow to the selected output or shut the flow off entirely.

BRIEF DESCRIPTION OF THE DRAWING

The above and other objects, features, and advantages will become more readily apparent from the following description, reference being made to the accompanying drawing in which:

FIG. 2 is a bottom view partly in section through the handle subassembly of this invention;

FIG. 5 is a partly sectional side view of the latch element in accordance with the invention;

FIGS. 6 and 7 are top and side views of the element of FIG. 5;

FIGS. 8 and 9 are side and top views of the actuating lever of the assembly.

SPECIFIC DESCRIPTION

Figure 1:
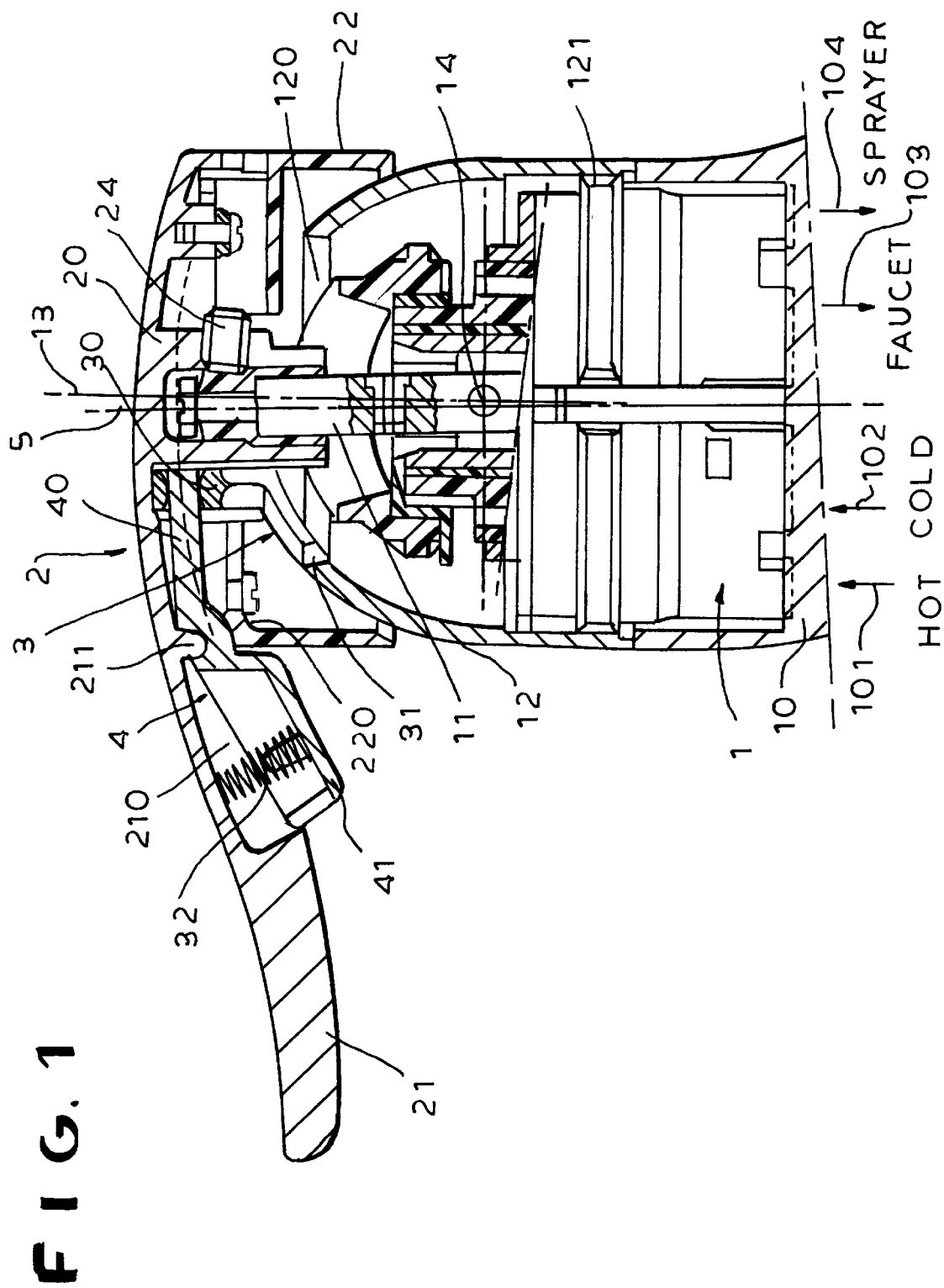
FIG. 1 is a partly diagrammatic vertical section through the valve and actuating assembly according to the invention with the valve in a central off position.

As seen in FIG. 1 a valve cartridge 1 as described in above-cited copending application Ser. No. 08/962,373 is secured by unillustrated screws in a fixed housing 10 and is connected to hot- and cold-water inputs shown schematically at 101 and 102 and to outputs 103 and 104 leading respectively to a faucet and to a sprayer. This cartridge 1 has a stem 11 that is centered on a stem axis 15 and that can be tipped back and forth about a transverse axis 14 to vary the rate of flow between the inputs 101 and 102 and the outputs 103 and 104, and can be twisted from side to side about a center axis 13 to vary the mix of hot and cold water from the inputs 101 and 102 that is fed to the outputs 103 and 104. When the stem 11 is in the upright position shown in FIG. 1 with the stem axis 15 almost lying on the axis 13 there is no flow through the cartridge. In the FIG. 3 position all flow is diverted to the faucet output 103. In the FIG. 4 position all flow is diverted to the sprayer output 104. In either of the FIGS. 3 and 4 positions, twisting the stem 11 about the axis 13 changes the mix of hot and cold water supplied to whichever output is being fed. This is all standard.

The stem 1 is operated by an actuator 2 extending generally radially of the axes 13 and 15 and perpendicular to the axis 14 and formed with a tubular collar 20 centered on the axis 15 and fitted down around the stem 11 and secured thereto by a set screw 24. The actuator 2 carries a latch 3 (FIGS. 5–7) comprised of an arm 31 extending generally radially of the axis 15 and of a body 30 slidable parallel to the axis 15 in a guide 201 formed of complementary cross section in the actuator 2. An actuating lever 4 (FIGS. 8 and 9) has a seat 42 fitted with a pivot 211 extending on the handle 21 parallel to the axis 14 and has an inner arm 40 extending into a hole 33 of the latch element 3 and an opposite outer arm 41 provided with a pin 43 on which is mounted a spring 32 that urges the outer arm 41 down and the inner arm 40 up.

The valve 1 has a screwthread 121 to which is threaded a cover sleeve 12 that is centered on the axis 13 and that has an upper inner periphery 120 of cylindrical shape also centered on the axis 13 and aligned with an outer end of the arm 31 of the latch 3 in an upper rest position thereof. In addition a skirt 22 is secured by screws 23 to the bottom of the actuator 2 and forms a lower seat 220 for the lever 2 so that same is captured. Thus when the outer arm 41 of the lever 4 is pushed up, the inner end 40 and the latch element 3 must move down, and vice versa.

The lower edge of the skirt 22 projects downward in all positions of the system beyond the upper rim 120 of the cover sleeve 12.

The system described above is operated as follows:

To start with the system is in the position of FIG. 1 with no water flow from either of the inputs 101 and 102 to either of the outputs 103 and 104.

Figure 3:
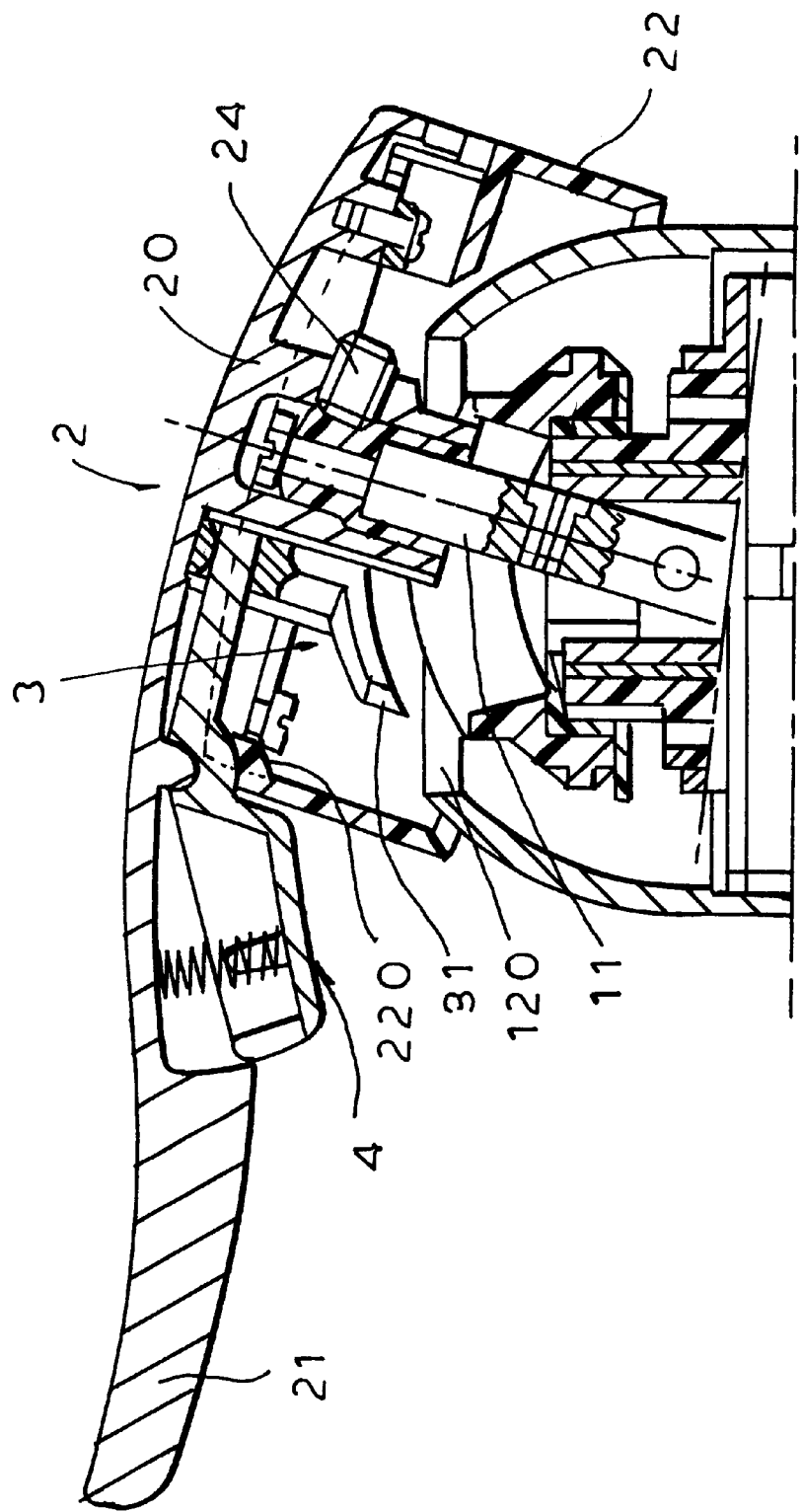
FIGS. 3 and 4 are views like FIG. 1 but with the valve in its two end positions.
Figure 4:
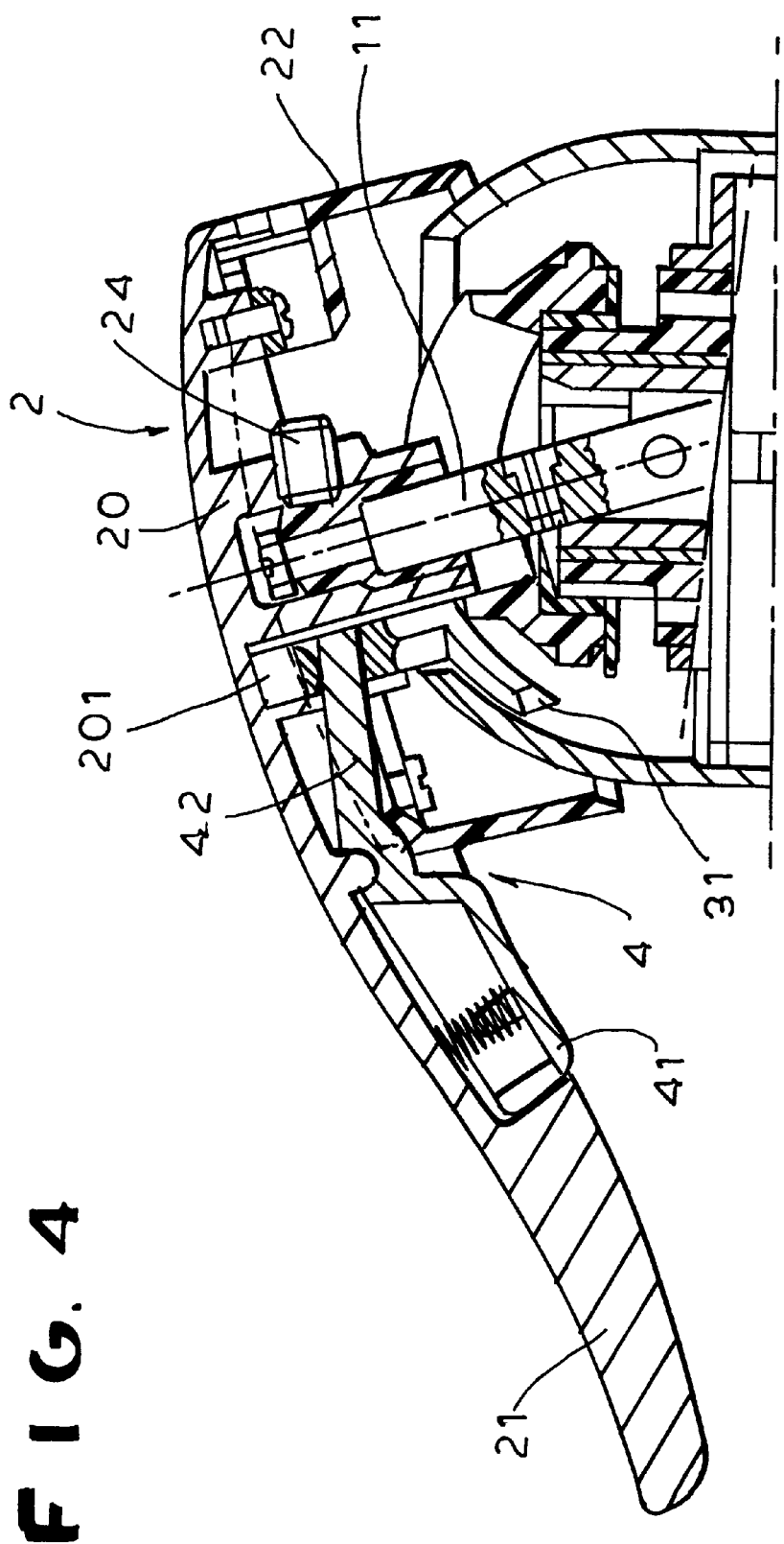

Normally, even if the user intends to use the sprayer, he or she starts by tipping the handle 21 forward about the axis 14 to initiate flow from the faucet output 103 at the desired rate and then works the lever arm 21 to one side or the other to get the desired temperature, moving to the FIG. 3 position. If the faucet is all that is needed, the handle 21 is left in this position. To stop flow the user simply pivots the handle 21 back down until the arm 31 encounters the rim 120, thereby stopping the actuator in the closed position.

If, however, flow is wanted from the sprayer connected to the output 104, the user then pivots the handle 21 back while raising the outer arm 41 of the lever 4. This action pushes down the latch 3 so that its arm 31 is out of line with the rim 120 and the entire assembly can move into the FIG. 4 position, feeding all the water to the sprayer output 104. So long as the angular position about the axis 13 has not been changed, the outputted water will be at the same temperature as previously set. Once the user is done with the sprayer, the handle 21 is tipped back up and, once the arm 31 clears the rim 120, the spring 32 will snap the latch 3 back up.

At no time is the latch 3 or rim 120 exposed. The mechanism remains hidden and the latch arm 31 never contacts the outer surface of the ball-shaped upper end of the cover sleeve 12. Furthermore due to the concentricity of the rim 120 and various parts, the latch 3 works in all angular positions of the actuator 2.

Figure 10:
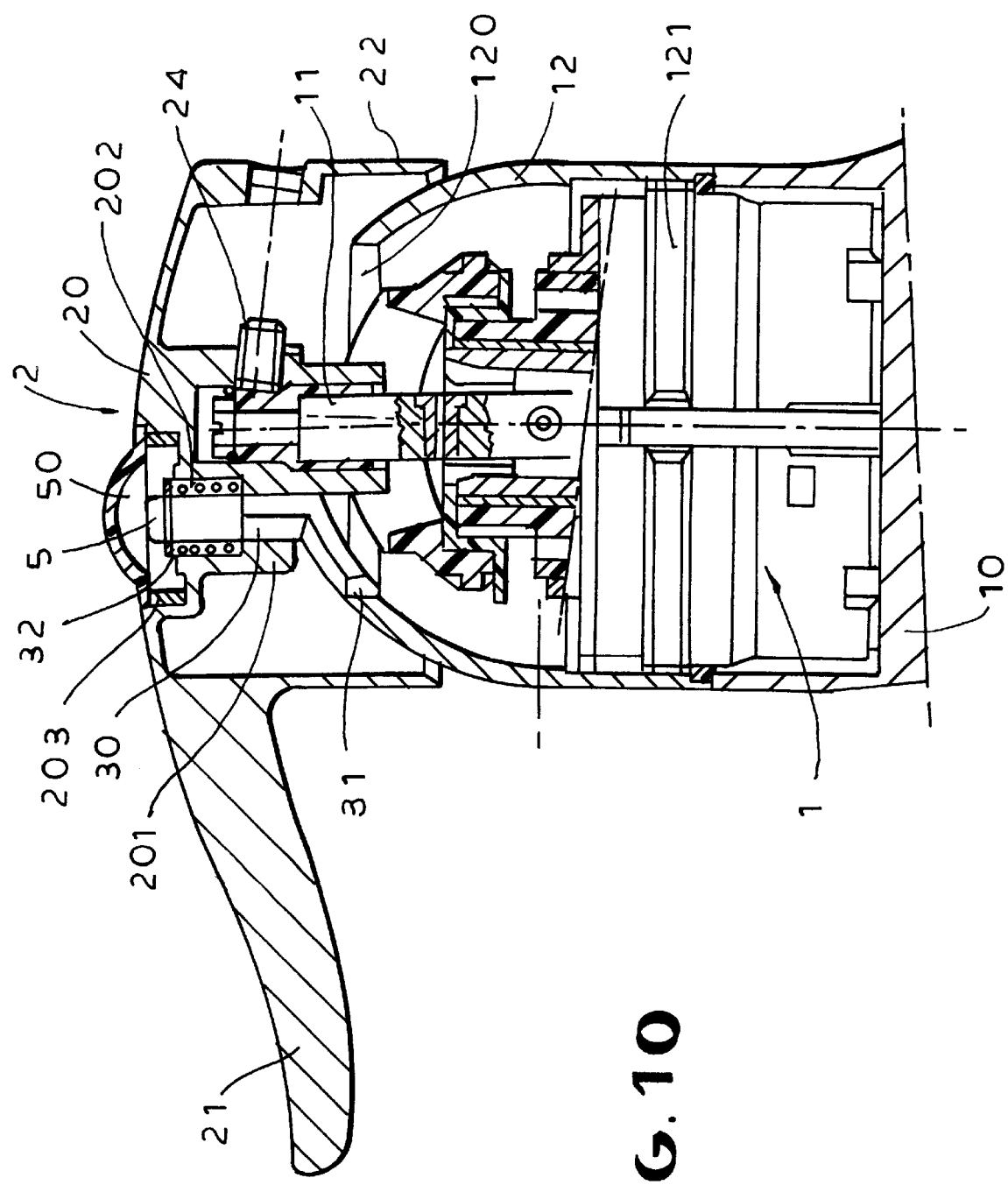
FIGS. 10 and 11 are vies like respective FIGS. 1 and 4 of an alternative arrangement according to the invention.
Figure 11:
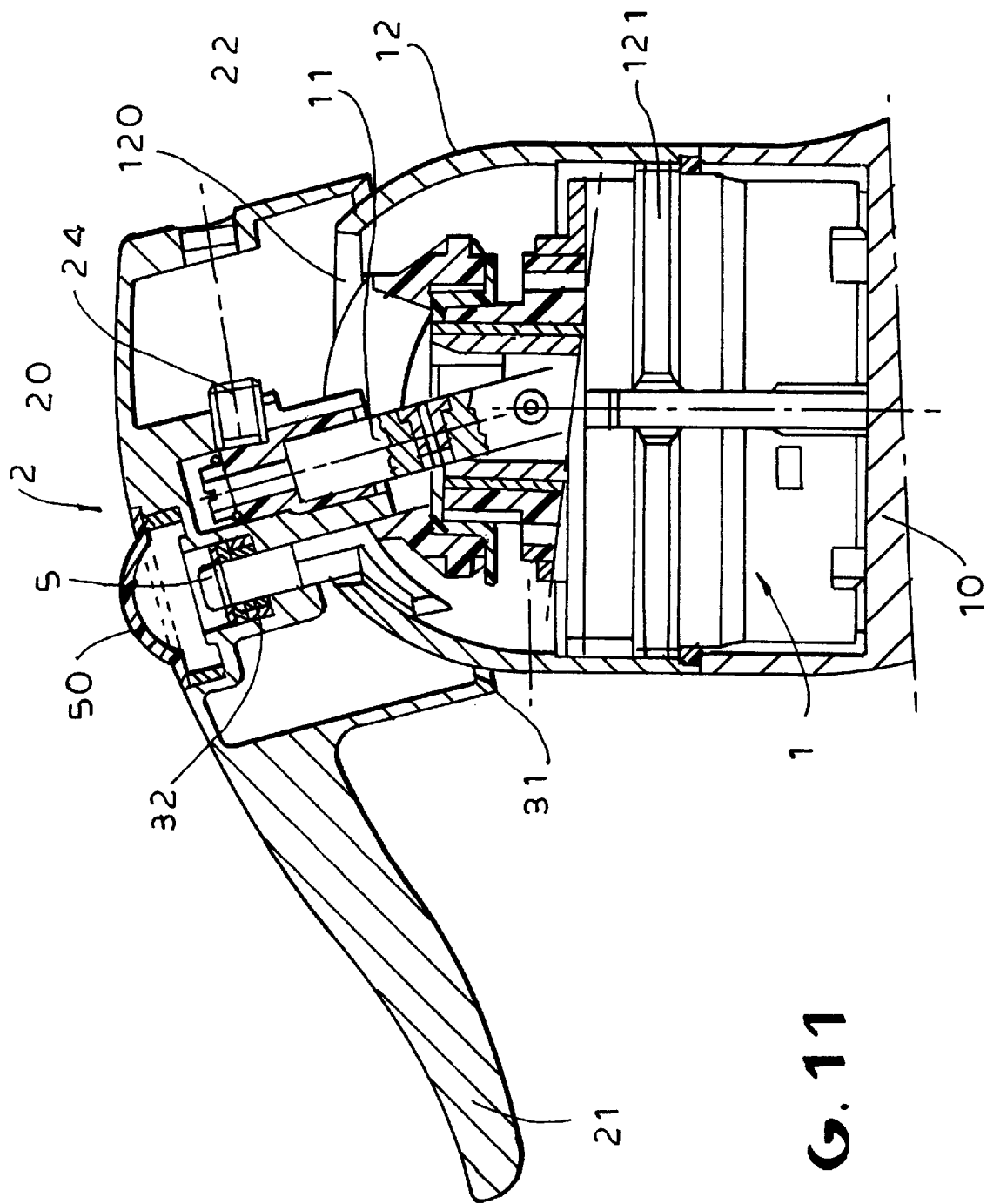

The system of FIGS. 10 and 11 works similarly but has an actuator 2 formed integrally with the skirt 22. The guide 201 is widened or counterbored at 202 to receive a coil-type compression spring 32 braced between a lower end of the counterbore 202 and a head 5 formed on an upper end of the body 30 of the latch 3. An elastically deformable membrane 50 covers the button end 5 so that the user can push down on this membrane 50 and displace the arm 31 into the down position as shown in FIG. 11 in which the back nonpreferred position of the valve 1 can be assumed.

We Claim:

1. In combination with a valve having an input and two outputs and provided with a stem extending radially from a transverse axis and pivotal thereabout from a middle position to one end position directing flow from the input to one of the outputs and to an opposite end position directing flow from the input to the other of the outputs, an actuator assembly comprising:

a sleeve fixed to the valve and having a rim annularly surrounding and spaced from the stem and lying in a plane generally parallel to the axis;

a handle fixed to the stem above the rim and forming a guide extending substantially parallel to the stem;

a latch element having an outwardly projecting arm having an outer end and displaceable in the guide between a rest position with the arm outer end engageable with the rim and blocking displacement of the stem into the one end position and an actuated position unengageable with the rim and permitting displacement of the stem into the one end position, the arm outer end having a part-cylindrical shape complementary to the rim; and a spring operatively braced between the latch element and the handle and urging the latch element into the rest position.

2. The valve actuator assembly defined in claim 1 wherein the sleeve is threaded to the valve.

3. The valve actuator assembly defined in claim 1 wherein the latch element has an upper end projecting as a button through the handle, the spring being engaged between the button and the handle.

4. The valve actuator assembly defined in claim 3 wherein the handle is provided with an elastically deformable membrane over the button and through which the button is actuatable.

5. The valve actuator assembly defined in claim 3 wherein the button is nonrotatable in the guide and is unitarily formed with the arm.

6. The valve actuator assembly defined in claim 1 wherein the valve has a second input and the stem is pivotal about an axis perpendicular to the transverse axis to vary a mix of flows from the inputs.

7. In combination with a valve having an input and two outputs and provided with a stem extending radially from a transverse axis and pivotal thereabout from a middle position to one end position directing flow from the input to one of the outputs and to an opposite end position directing flow from the input to the other of the outputs, an actuator assembly comprising:

a sleeve fixed to the valve and having a rim annularly surrounding and spaced from the stem and lying in a plane generally parallel to the axis;

a handle fixed to the stem above the rim and forming a guide extending substantially parallel to the stem;

a latch element having an outwardly projecting arm and displaceable in the guide between a rest position with the arm engageable with the rim and blocking displacement of the stem into the one end position and an actuated position unengageable with the rim and permitting displacement of the stem into the one end position;

a spring operatively braced between the latch element and the handle and urging the latch element into the rest position; and a lever pivoted on the handle and having an outer end accessible outside the sleeve and an opposite inner end engaged with the latch element, the spring being braced between the lever and the handle.

8. The valve actuator assembly defined in claim 7 wherein the arm has an outer end engageable with the rim and of a part-cylindrical shape complementary to the rim.

9. The valve actuator assembly defined in claim 7 wherein the handle is provided with a downwardly open recess in which the lever outer end is received, the spring being braced between the lever outer end and the handle.

10. The valve actuator assembly defined in claim 9 wherein the handle has a collar fitting over the stem, the guide being formed along the collar, the lever and the handle having complementary pivot formations defining for the lever a pivot axis generally parallel to the transverse axis.

11. The valve actuator assembly defined in claim 9 wherein the handle is provided with a skirt extending down around the rim of the sleeve.

12. The valve actuator assembly defined in claim 11 wherein the skirt is unitary with the handle.

13. The valve actuator assembly defined in claim 11 wherein the skirt is secured by screws to the handle.

* * * * *